United States Patent

Chastrette et al.

[11] Patent Number: 4,851,577
[45] Date of Patent: Jul. 25, 1989

[54] NEW SUBSTITUTED DERIVATIVES OF N-ETHYL(METH)ACRYLAMIDE AND A METHOD FOR THE PREPARATION THEREOF

[75] Inventors: Francine J. Chastrette, Caluire; Abdelhamid Stambouli, Villeurbanne, both of France

[73] Assignee: Societe Francaise Hoechst, Puteaux, France

[21] Appl. No.: 23,339

[22] Filed: Mar. 9, 1987

[30] Foreign Application Priority Data

Mar. 13, 1986 [FR] France .................. 86 03587

[51] Int. Cl.$^4$ .......................................... C07C 103/60
[52] U.S. Cl. ..................................... 564/208; 526/304
[58] Field of Search ..................... 564/208; 526/304

[56] References Cited

U.S. PATENT DOCUMENTS

| | | | |
|---|---|---|---|
| 2,357,283 | 9/1956 | Peters | 564/208 X |
| 2,830,972 | 4/1958 | Shacklett | 564/208 X |
| 3,037,056 | 5/1962 | Lowe et al. | 564/208 |
| 3,097,219 | 7/1963 | Butter et al. | 564/208 X |
| 3,663,573 | 5/1972 | Coleman | 564/208 X |
| 3,729,456 | 4/1973 | Hoke | 564/208 X |
| 4,013,655 | 3/1977 | Merz et al. | 564/208 X |
| 4,134,916 | 1/1979 | Mass et al. | 564/208 X |
| 4,508,594 | 4/1985 | Jansma et al. | 427/395 X |
| 4,521,563 | 6/1985 | Lucas | 525/382 X |

FOREIGN PATENT DOCUMENTS 0002767  7/1969  European Pat. Off. .
61-00053 1/1986 Japan ........................ 564/208
780284  7/1957 United Kingdom ........ 564/208
1103157 2/1968 United Kingdom ........ 564/208

*Primary Examiner*—Charles F. Warren
*Assistant Examiner*—Carolyn S. Greason
*Attorney, Agent, or Firm*—Browdy and Neimark

[57] ABSTRACT

Novel substituted derivatives of N-ethyl(meth)acrylamide complying with the general formula (I):

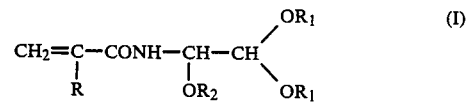

wherein $R=H$ or $-CH_3$, $R_1=C_1-C_8$ alkyl and $R_2=H$ or $C_1-C_8$ alkyl.

They may be obtained by a method in which (meth)acrylamide is reacted with a dialkoxy-2,2 ethanal of the formula (II):

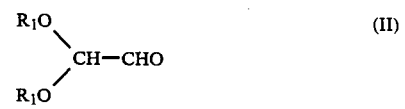

wherein $R_1$ has the meaning indicated above to provide a product of formula (I), in which $R_2=H$, and, if desired, by carrying out an etherification with a $C_1-C_8$ alkanol.

6 Claims, No Drawings

NEW SUBSTITUTED DERIVATIVES OF N-ETHYL(METH)ACRYLAMIDE AND A METHOD FOR THE PREPARATION THEREOF

BACKGROUND OF THE INVENTION

The present invention relates to novel substituted derivatives of N-ethyl(meth)acrylamide and a method for the preparation thereof.

1. Field of the Invention

The subject-matter of the present invention concerns products of the general formula (I):

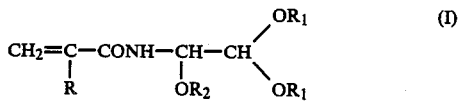

wherein R represents a hydrogen atom or a methyl radical, $R_1$ represents a $C_1$-$C_8$ alkyl group and $R_2$ represents a hydrogen atom or a $C_1$-$C_8$ alkyl group. The subject-matter of the present invention concerns more particularly the products as defined above, characterized in that in formula (I), R represents a hydrogen atom, $R_1$ represents a $C_1$-$C_4$ alkyl group and $R_2$ represents a hydrogen atom or a $C_1$-$C_4$ alkyl group. Among these products the following may be specified in particular:

N-(trimethoxy-1,2,2 ethyl) propene-2 amide,
N-(triethoxy-1,2,2 ethyl) propene-2 amide,
N-(dimethoxy-2,2 hydroxyl-1 ethyl) propene-2 amide,
N-(diethoxy-2,2 hydroxy-1 ethyl) propene-2 amide.

2. Description of the prior art

Derivatives are known substituted on the nitrogen atom of (meth)acrylamide having either an acetal function (European Patent Application No. 0.002.767 and U.S. Pat. No. 4,508,594), or an N-(meth)acryloylhemiacetal function (U.S. Pat. No. 4,521,563); however, according to the Applicant's information, the monomers of the present invention of the general formula I, simultaneously having two vicinal carbon atoms, one of which has an acetal function and the other an N-acylhemiacetal function, are not described in the prior art.

STATEMENT OF THE INVENTION

In accordance with the invention, the aforementioned products of formula (1) can be prepared using a method characterized in that the (meth)acrylamide is caused to react with a dialkoxy-2,2 ethanal of the formula (II):

wherein $R_1$ has the meaning indicated above to provide a corresponding product of formula (I), in which $R_2$ represents a hydrogen atom and which, if desired, is etherified to form a corresponding product of formula (I), in which $R_1$ and $R_2$, which are identical or different, represent a $C_1$-$C_8$ alkyl group.

DETAILED DESCRIPTION OF THE INVENTION

Under the preferred conditions in which the invention is put into practice, the condensation of (meth) acrylamide with a dialkoxyethanal of formula (II) is carried out in an inert atmosphere and:

at a temperature of between 50° and 100° C., preferably at 70°±5° C.;
with a slight excess of one or other of the reagents;
in the presence of a small quantity of an antioxidant, such as paramethoxyphenol.

In accordance with the invention, the etherification of the products of formula (I) mentioned above, in which $R_2$ represents a hydrogen atom, to form products of the aforementioned formula (I) in which $R_2$ represents a $C_1$-$C_8$ alkyl group, is carried out by a method characterized in that the alkanol corresponding to formula (III), $R_3OH$, in which $R_3$ represents a $C_1$-$C_8$ alkyl group, is caused to react in the presence of catalytic quantities of an acid with a product of formula (I), in which $R_2$ represents a hydrogen atom.

Under the preferred conditions in which this latter method is carried out, the etherification is effected at a temperature of between 50° C. and the reflux temperature of the reaction medium in the presence of an excess of alkanol of formula (III) and of catalytic quantities of an acid, such as hydrochloric acid, paratoluenesulphonic acid or sulphuric acid.

The products of formula (I) exhibit significant properties in respect of macromolecular chemistry. In particular, they may be used as monomers in the preparation of various polymers.

The following examples illustrate the invention but without implying any limitation thereof.

The nuclear magnetic resonance spectra were obtained in deuterated chloroform. The chemical shifts are expressed in ppm (parts per million) in relation to tetramethylsilane used as an internal reference. The $^1H$ NMR spectra were determined on a VARIAN appliance at 60 MHz and the $^{13}C$ NMR spectra on a VARIAN XL 100 appliance at 25.2 MHz with FOURIER transform. The mass spectra were determined on a VARIAN Mat CH5 appliance at 70 eV.

EXAMPLE 1

The following are heated for two hours at 70° C. in an inert atmosphere:

23.8 mmoles of diethoxy-2,2 ethanal,
24 mmoles of acrylamide,
0.1 mmole of paramethoxyphenol.

23.3 mmoles of crude N-(diethoxy-2,2 hydroxy-1 ethyl) propene-2 amide are thus obtained, the $^{13}C$ NMR spectrum of which is as follows: 15.26 (2q. 2CH$_3$) 63.53 (t. CH$_2$); 63.96 (t. CH$_2$); 73.6 (d. N—CHO); 102 (d. O—CHO); 127.3 (m.=CH$_2$); 130.8 (m.=CH); 166 (s. N—CO).

This crude product is dissolved in 1.38 g (30 mmoles) of ethanol containing 0.49 g of concentrated sulphuric acid per litre, then the solution is heated in an inert atmosphere for 4 hours at 70° C. The cooled reaction medium is then redissolved in water and the desired product is extracted with dichloromethane. The combined organic phases are then washed with water, dried, filtered and evaporated under vacuum.

5.1 g (21.2 mmoles) of N-(triethoxy-1,2,2 ethyl) propene-2 amide are thus obtained having a melting point of 33°±2° C., i.e. a yield of 89% calculated theoretically in relation to the ethoxy-2,2 ethanal used.

Physical analyses $^1$H NMR : 1.2 (m. 9H); 3.6 (m. 6H); 4.5 (d. 1H); 5.4 (d.d., 1H); 5.8 (d.d., 1H); 6.2 (m. 2H);

$^{13}$C NMR : 15.08 (q. CH$_3$); 15.18 (q. CH$_3$); 15.25 (q. CH$_3$); 63.36 (t. CH$_2$); 64.01 (2t. CH$_2$); 79.04 (d. O—CH—N);

101.71 (d. O—CHO); 127.2 (m. CH); 130.7 (m.=CH2); 165.9 (s. N—C=O).

Mass spectrum : M 231 (0%); 186 (2%); 161 (2%); 141 (5%); 139 (5%); 128 (6%); 103 (100%); 75 (53%); 59 (25%); 55 (20%).

EXAMPLE 2

The following are heated for two hours at 70° C. in an inert atmosphere:
- 67 mmoles of acrylamide,
- 69 mmoles of dimethoxy-2,2 ethanal,
- 0.14 mmole of paramethoxyphenol.

67 mmoles of crude N-(dimethyoxy-2,2 hydroxy-1 ethyl) propene-2 amide are thus obtained.

The following are heated for four hours at 70° C. in an inert atmosphere:
- 67 mmoles of N-(dimethoxy-2,2 hydroxy-1 ethyl) propene-2 amide previously prepared in :
- 84 mmoles of methanol containing 5 mmoles of concentrated sulphuric acid per litre.

The reaction medium is then redissolved in water and the desired product is extracted with dichloromethane.

The combined organic phases are washed with water, dried, filtered and concentrated under vacuum. 40 mmoles of N-(trimethoxy-1,2,2 ethyl) propene-2 amide are thus obtained.

It is to be understood that the present invention has only been described by way of example and without limitation, and that any modification, particularly insofar as equivalents are concerned, could be made thereto without departing from the scope thereof.

What is claimed is:

1. A compound of the formula (I):

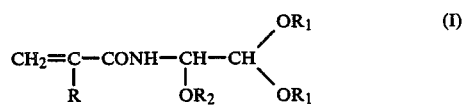

wherein R is selected from the group consisting of a hydrogen atom and a methyl radical, R$_1$ is a C$_1$–C$_8$ alkyl group and R$_2$ is selected from the group consisting of a hydrogen atom and a C$_1$–C$_8$ alkyl group.

2. A compound according to claim 1, in which R is hydrogen, R$_1$ is a C$_1$–C$_4$ alkyl group and R$_2$ is selected from the group consisting of a hydrogen atom and a C$_1$–C$_4$ alkyl group.

3. A compound according to claim 1, said compound being N-(trimethoxy-1,2,2 ethyl) propene-2 amide.

4. A compound according to claim 1, said compound being N-(triethoxy-1,2,2 ethyl) propene-2 amide.

5. A compound according to claim 1, said compound being N-(dimethoxy-2,2 hydroxy-1 ethyl) propene-2 amide.

6. A compound according to claim 1, said compound being N-(dimethoxy-2,2 hydroxy-1 ethyl) propene-2 amide.

* * * * *